United States Patent
Shelke et al.

(10) Patent No.: US 12,512,992 B2
(45) Date of Patent: Dec. 30, 2025

(54) REAL TIME CHANNEL AFFINITY DERIVATION

(71) Applicant: Bank of America Corporation, Charlotte, NC (US)

(72) Inventors: Sushama Shelke, Mumbai (IN); Ayela Chughtai, New York, NY (US); Nipun Mahajan, Lawrenceville, NJ (US); Amit Mishra, Chennai (IN); Yogesh Raghuvanshi, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 61 days.

(21) Appl. No.: 18/380,780

(22) Filed: Oct. 17, 2023

(65) Prior Publication Data
US 2025/0125963 A1    Apr. 17, 2025

(51) Int. Cl.
*H04L 29/06* (2006.01)
*H04L 9/32* (2006.01)

(52) U.S. Cl.
CPC .......... *H04L 9/3215* (2013.01); *H04L 9/3213* (2013.01); *H04L 9/3297* (2013.01)

(58) Field of Classification Search
None
See application file for complete search history.

(56) References Cited

U.S. PATENT DOCUMENTS

| | | | |
|---|---|---|---|
| 7,792,976 B2 | 9/2010 | Zhao et al. | |
| 9,379,971 B2 | 6/2016 | Sem-Jacobsen et al. | |
| 10,171,657 B1 | 1/2019 | Anandadoss et al. | |
| 10,296,913 B1 | 5/2019 | Breitman et al. | |
| 10,534,586 B2 | 1/2020 | Cavalcante | |
| 10,972,523 B2 * | 4/2021 | Van Wie | A63F 13/12 |
| 11,373,045 B2 * | 6/2022 | Bealby-Wright | G06N 3/045 |
| 11,568,231 B2 | 1/2023 | Meteer et al. | |

(Continued)

FOREIGN PATENT DOCUMENTS

KR    20220016873 A    2/2022

OTHER PUBLICATIONS

Awati, Rahul, et al., "Definition of Omnichannel," TechTarget, Accessed Oct. 16, 2023, https://www.techtarget.com/searchcustomerexperience/definition/omnichannel.

(Continued)

*Primary Examiner* — Andrew J Steinle
(74) *Attorney, Agent, or Firm* — Banner & Witcoff, Ltd.

(57) ABSTRACT

Systems and methods are disclosed for real time, frictionless channel switching to map and transpose a transaction on a preferred channel from an incoming channel. The systems and methods may use a machine learning model that processes features from a plurality of channels to determine the preferred channel. An omni channel processor is used to determine intended functionality data of the transaction for the preferred channel. The systems and methods may generate transposed intent data based on the intended functionality data of the transaction for the preferred channel. A deep link is generated and embedded with the transposed intent data and a channel access token for the transaction on the preferred channel. The deep link is configured to access and complete the requested transaction on the preferred channel.

20 Claims, 8 Drawing Sheets

(56) References Cited

U.S. PATENT DOCUMENTS

| | | | |
|---|---|---|---|
| 2015/0254655 A1* | 9/2015 | Bondesen | G06Q 20/3821 |
| | | | 705/72 |
| 2019/0066117 A1 | 2/2019 | Fortin | |
| 2020/0014642 A1 | 1/2020 | Sidi et al. | |
| 2020/0233725 A1 | 7/2020 | Marudhachalam et al. | |
| 2021/0089624 A1 | 3/2021 | Bealby-Wright et al. | |
| 2024/0179193 A1 | 5/2024 | Maurer et al. | |
| 2024/0386435 A1 | 11/2024 | Kennedy et al. | |
| 2025/0124453 A1 | 4/2025 | Mahajan et al. | |
| 2025/0124454 A1 | 4/2025 | Mahajan et al. | |
| 2025/0125963 A1 | 4/2025 | Mahajan et al. | |

OTHER PUBLICATIONS

Ye, Hao, et al., "Channel Agnostic End-to-End Learning based Communication Systems with Conditional GAN," School of Electrical and Computer Engineering, Georgia Institute of Technology, Jul. 2, 2018, https://arxiv.org/pdf/1807.00447.pdf.

Hostetler, Megan, "The Break-Up Series: Spotting Cross-Channel Personalization Red Flags," SAP Emarsys, May 18, 2022. https://emarsys.com/learn/blog/spotting-cross-channel-personalization-red-flags/.

de Leon, Kellie, "What is Omnichannel Customer Experience?" Treasure Data Blog, Mar. 22, 2023, https://blog.treasuredata.com/blog/2023/01/13/omnichannel-customer-experience-tda/.

"How to Merge Offline and Online Retail in an Omnichannel Reality," APSIS, Feb. 1, 2023, https://apsis.com/blog/how-merge-offline-and-online-retail-omnichannel-reality.

Jul. 22, 2025—(US) Notice of Allowance—U.S. Appl. No. 18/380,773.

R. Vergallo and L. Mainetti, "The Role of Technology in Improving the Customer Experience in the Banking Sector: A Systematic Mapping Study," in IEEE Access, vol. 10, pp. 118024-118042, 2022, doi: 10.1109/ACCESS.2022.3218010 (Year: 2022).

Jul. 28, 2025—(US) Non-Final Office Action—U.S. Appl. No. 18/380,791.

* cited by examiner

REAL TIME CHANNEL AFFINITY DERIVATION

BACKGROUND

Enterprise organizations provide services by using various computing infrastructure. Enterprise organizations service clients by completing tasks through different systems. A desired client task may be serviced in one way on a first system and in a different way on second system. Oftentimes, if a client is being serviced on a first system that cannot complete the desired task, the client will have to manually perform steps, such as logging into an account on a second system, to complete the desired task. This and other shortcomings in enterprise systems are desirable for improvement.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues in the prior art with locating and completing a requested transaction on a different channel than a current channel or incoming channel. The use of these solutions and techniques may result in a variety of benefits and advantages including reducing the time a client and/or customer needs to execute a requested transaction on a new channel, improving cost efficiency of channels, and improving efficiency of channel traffic for a specific channel. For example, a requested transaction on the incoming channel may not be supported on the incoming channel. For a client and/or customer to execute the requested transaction on a new channel that supports the requested transaction's functionality, the client and/or customer would need to login to the new channel and navigate through various steps on the new channel in order to complete the requested transaction. With frictionless or seamless channel switching, the client and/or customer is sent a deep link for the new channel that will automatically authenticate and login the client and/or customer into the new channel to perform or complete the requested transaction without having to navigate through various steps and manually logging in on the new channel.

In accordance with one or more embodiments, a system or method comprising an enterprise computing platform is disclosed. The enterprise computing platform, with at least one processor and memory storing computer-readable instruction that, when executed by the at least one processor, cause the enterprise computing platform to perform one or more functions or methods described herein. The enterprise computing platform may receive, from an incoming channel, incoming channel data that may comprise a customer unique identifier (ID) and a requested transaction. The requested transaction may comprise incoming intent tags. The enterprise computing platform may receive a plurality of channel input data. Each channel input data of the plurality of channel input data may relate to a channel from a plurality of channels. The enterprise computing platform may extract numerical features from the plurality of channel input data based on the customer unique ID and incoming intent tags. The enterprise computing platform may extract intent features from the plurality of channel input data based on the incoming intent tags. The numerical features and intent features may be inputted into an eligibility machine learning model. The eligibility machine learning model may process the numerical features and intent features to determine a preferred channel for the requested transaction. The eligibility machine learning model may then output the preferred channel. The enterprise computing platform may generate a message requesting permission to perform the requested transaction on the preferred channel. The enterprise computing platform may identify a user device associated with the preferred channel based on the customer unique ID and send the message to the user device through the preferred channel.

In some embodiments, the eligibility machine learning model may be trained and developed based on channel specific databases. Each channel specific database may store historical channel input data for a channel.

In some embodiments, each historical channel input data in each channel specific database may be collected for a channel over a period of time.

In some embodiments, the user device may receive the message. A user of the user device may reject the message's permission to perform the requested transaction on the preferred channel and the requested transaction may proceed on the incoming channel.

In some embodiments, the user device may receive the message. A user of the user device may accept the message's permission to perform the requested transaction on the preferred channel.

In some embodiments, the eligibility machine learning model may be an artificial neural network.

In some embodiments, each channel input data of the plurality of channel input data may comprise information on a number of times different requested transactions were completed on a channel, a number of times a channel was used by a customer, a period of time from when a channel was last used by a customer, periods of time to resolve different requested transactions on a channel historically, traffic data for a channel, a cost of a channel, a channel availability flag, functionality availability flags, and complexity flags.

In some embodiments, the numerical features may comprise features for a number of times the requested transaction was completed on a channel, a number of times a channel was used for the customer unique ID, a period of time from when a channel was last used for the customer unique ID, periods of time to resolve the requested transaction on a channel historically, traffic data for a channel, and a cost of a channel.

In some embodiments, the intent features may comprise features for availability data of a channel for the customer unique ID, functionality data of the requested transaction on a channel, and complexity data of the requested transaction on a channel.

In some embodiments, the user device may be a smart phone, tablet, smart watch, mobile device, or personal computing device.

In some embodiments, the plurality of channel input data may be unstructured data.

In another embodiment, the enterprise computing platform may receive, from an incoming channel, an incoming authentication token and incoming channel data that may comprise a customer unique identifier ID and a requested transaction. The requested transaction may comprise incoming intent tags and incoming variable fields. The enterprise computing platform may receive customer profile data associated with the customer unique ID. The enterprise computing platform may receive a preferred channel. The enterprise computing platform may receive preferred intent tags and preferred variable fields associated with the preferred channel. The enterprise computing platform may generate a channel access token and validate the channel access token based on the incoming authentication token and the customer profile data. The enterprise computing platform may map the preferred intent tags on the preferred channel from the incoming intent tags of the requested transaction. The enterprise computing platform may transpose, based on the customer profile data and mapped preferred intent tags, the preferred variable fields from the incoming variable fields. The enterprise computing platform may generate transposed intent data comprising the mapped preferred intent tags and the transposed preferred variable fields. The enterprise computing platform may generate a deep link configured to access the requested transaction on the preferred channel and embed the deep link with the channel access token and the transposed intent data. The enterprise computing platform may identify a user device associated with the preferred channel based on the customer unique ID and send the deep link to the user device through the preferred channel.

In some embodiments, the enterprise computing platform may receive a failure flag indicating the requested transaction failed on the preferred channel. The enterprise computing platform may receive a secondary preferred channel. The enterprise computing platform may receive secondary intent tags and secondary variable fields associated with the secondary preferred channel. The enterprise computing platform may generate a second channel access token and validate the second channel access token based on the incoming authentication token and the customer profile data. The enterprise computing platform may map the secondary intent tags on the secondary preferred channel from the incoming intent tags of the requested transaction. The enterprise computing platform may transpose, based on the customer profile data and mapped secondary intent tags, the secondary variable fields from the incoming variable fields. The enterprise computing platform may generate a second transposed intent data comprising the mapped secondary intent tags and the transposed secondary variable fields. The enterprise computing platform may generate a secondary deep link configured to access the requested transaction on the secondary preferred channel and embed the secondary deep link with the second channel access token and the second transposed intent data. The enterprise computing platform may identify a second user device associated with the secondary preferred channel based on the customer unique ID and send the secondary deep link to the second user device through the secondary preferred channel.

In some embodiments, the deep link may be configured to access and complete the requested transaction on the preferred channel at the user device.

In some embodiments, the user device may receive the deep link. A user of the user device may interact with the deep link and access the requested transaction on the preferred channel. The requested may be completed on the preferred channel.

In some embodiments, the received preferred channel may be from a post-channel processor.

In some embodiments, the received preferred intent tags and preferred variable fields may be from an omni channel processor.

In some embodiments, the validate the channel access token based on the incoming authentication token may further comprise time stamping the channel access token.

In some embodiments, the channel access token may be configured to authenticate the user device on the preferred channel.

In some embodiments, the transposed intent data is used to complete the requested transaction seamlessly on the preferred channel.

In another embodiment, the enterprise computing platform may comprise an omni channel processor and a pre-channel processor. The omni channel processor may receive, from an incoming channel, incoming channel data comprising a customer unique ID and a requested transaction. The requested transaction may comprise incoming intent tags. The omni channel processor may receive a plurality of channel functionality data. Each channel functionality data may relate to a channel from a plurality of channels. Each channel functionality data may comprise a channel ID, a channel availability flag, functionality availability flags, complexity flags, channel intent tags, and channel variable fields for a channel. The omni channel processor may process the incoming intent tags to determine a functionality ID associated with the requested transaction. The omni channel processor may process the plurality of channel functionality data based on the functionality ID and customer unique ID to determine an intent score for each channel of the plurality of channels. The omni channel processor may generate and store a standardized intent label. The omni channel processor may map, in the standardized intent label, the channel intent tags, channel variable fields, and channel ID with the functionality ID for each channel of the plurality of channels having an intent score above a pre-determined threshold. The omni channel processor may receive a preferred channel. The omni channel processor may process the standardized intent label based on the channel ID matching the preferred channel to determine preferred intent tags and preferred variable fields associated with the preferred channel. The omni channel processor may send the preferred intent tags and preferred variable fields to a pre-channel processor that may be used in a channel switching process for the requested transaction.

In some embodiments, the omni channel processor may receive a secondary preferred channel. The omni channel processor may process the standardized intent label based on the channel ID matching the secondary preferred channel to determine secondary intent tags and secondary variable fields associated with the secondary preferred channel. The omni channel processor may send the secondary intent tags and secondary variable fields to a pre-channel processor that may be used in a second channel switching process for the requested transaction.

In some embodiments, the process the plurality of channel functionality data based on the functionality ID and customer unique ID to determine an intent score for each channel of the plurality of channels may further comprise processing the channel availability flag, functionality availability flags, and complexity flags for each channel functionality data to determine the intent score.

In some embodiments, the channel availability flag may indicate a channel is accessible for a customer.

In some embodiments, the functionality availability flags may indicate the functionalities of different transactions for a channel.

In some embodiments, the complexity availability flags may indicate the complexities of different transactions for a channel In some embodiments, the channel intent tags may comprise label information for different transaction on a channel In some embodiments, the channel variable fields may comprise data format information for different transactions on a channel.

These and additional aspects will be appreciated with the benefit of the disclosures discussed in further detail below. Moreover, the figures herein illustrate the foregoing embodiments in detail.

BRIEF DESCRIPTION OF THE DRAWINGS

A more complete understanding of aspects described herein and the advantages thereof may be acquired by referring to the following description in consideration of the accompanying drawings, in which like reference numbers indicate like features.

DETAILED DESCRIPTION

Figure 1:
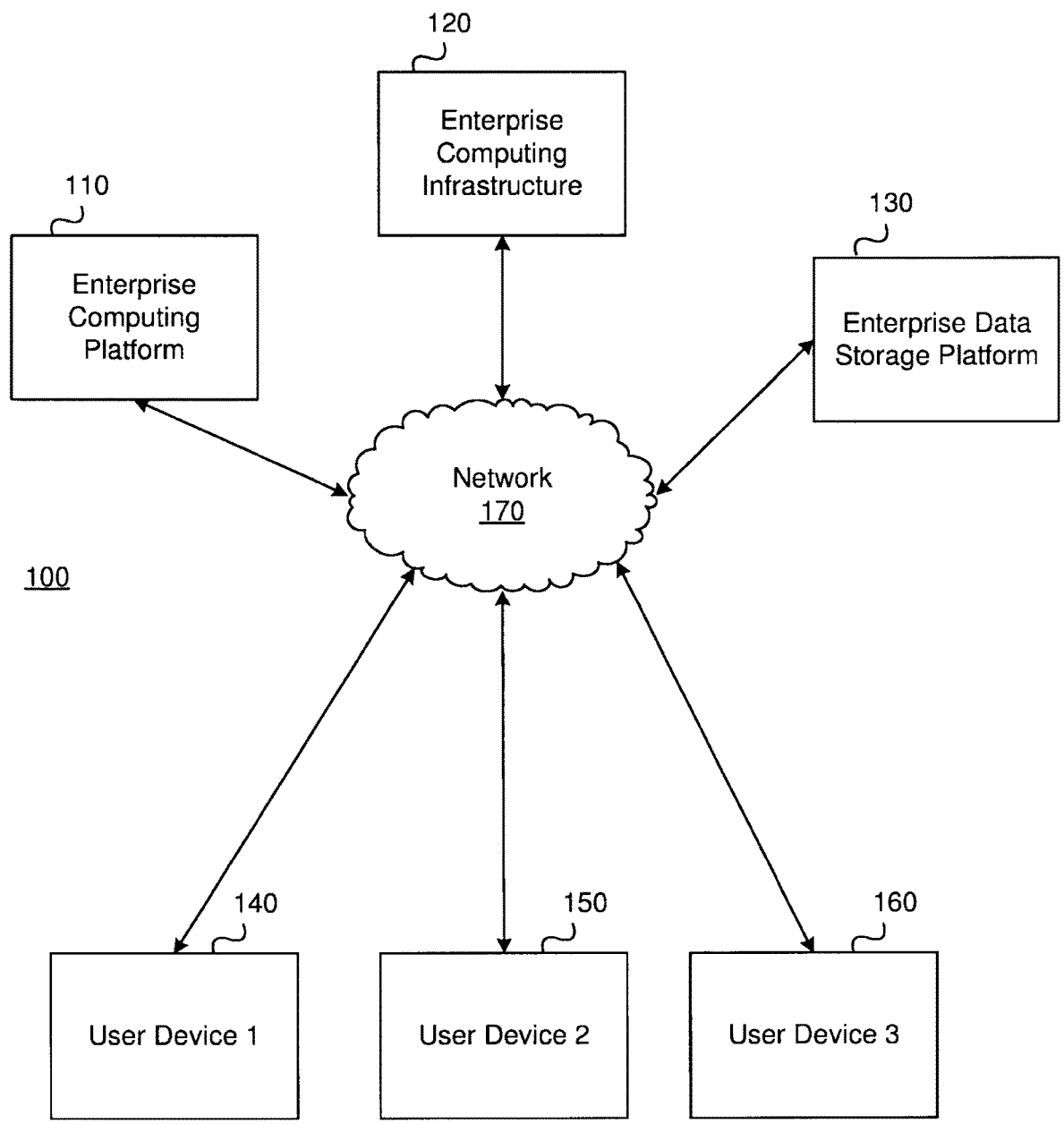
FIG. 1 depicts an illustrative example of a computing environment in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

It is noted that various connections between elements are discussed in the following description. It is noted that these connections are general and, unless specified otherwise, may be direct or indirect, wired or wireless, and that the specification is not intended to be limiting in this respect.

As a general introduction to the subject matter described in more detail below, aspects described herein are directed towards the methods and systems disclosed herein. Aspects of this disclosure provide effective, efficient, scalable, and convenient technical solutions that address various issues in the prior art with locating and completing a requested transaction on a different channel than a current channel or incoming channel. The use of these solutions and techniques may result in a variety of benefits and advantages including reducing the time a client and/or customer needs to execute a requested transaction on a new channel, improving cost efficiency of channels, and/or improving efficiency of channel traffic for a specific channel. For example, a requested transaction on the incoming channel may not be supported on the incoming channel. For a client and/or customer to execute the requested transaction on a new channel that supports the requested transaction's functionality, the client and/or customer would need to login to the new channel and navigate through various steps on the new channel in order to complete the requested transaction. With frictionless or seamless channel switching, the client and/or customer is sent a deep link for the new channel that will automatically authenticate and login the client and/or customer into the new channel to perform or complete the requested transaction without having to navigate through various steps and manually logging in on the new channel.

This disclosure relates to systems and methods disclosed for real time, frictionless channel switching to map and transpose a transaction on a preferred channel from an incoming channel. The systems and methods may use a machine learning model that processes features from a plurality of channels to determine the preferred channel. An omni channel processor is used to determine intended functionality data of the transaction for the preferred channel. The systems and methods may generate transposed intent data based on the intended functionality data of the transaction for the preferred channel. A deep link is generated and embedded with the transposed intent data and a channel access token for the transaction on the preferred channel. The deep link is configured to access and complete the requested transaction on the preferred channel.

FIG. 1 depicts an illustrative example of computing environment 100 in accordance with one or more illustrative aspects described herein. Computing environment 100 may comprise one or more computing devices and/or computer systems. For example, computing environment 100 may include an enterprise computing platform 110, an enterprise computing infrastructure 120, an enterprise data storage platform 130, user device 140, user device 150, and user device 160. In some arrangements, computing environment 100 may include additional computing devices, user devise, computing systems, computing platforms, and networks that are not depicted in FIG. 1.

As illustrated in greater detail below in FIGS. 2A and 2B, enterprise computing platform 110 may include one or more computing devices configured to perform one or more of the functions described herein. For example, enterprise computing platform 110 may include one or more computers (e.g., laptop computers, desktop computers, servers, server blades, or the like) and/or other computer components (e.g., processors, memories, communication interfaces).

Enterprise computing infrastructure 120 may be associated with a distinct entity such as a company, enterprise organization and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Enterprise computing infrastructure 120 may include computing hardware and software that may be configured to host, execute, and/or otherwise provide various data or one or more enterprise applications. For example, enterprise computing infrastructure 120 may be configured to host, execute, and/or otherwise provide one or more enterprise mobile application for user devices and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain a plurality data and/or other information. In addition, enterprise computing infrastructure 120 may process and/or otherwise execute tasks based on commands and/or other information received from other computer systems included in computing environment 100. Additionally, or alternatively, enterprise computing infrastructure 120 may receive instructions from enterprise computing platform 110 and execute the instructions in a timely manner.

Enterprise data storage platform 130 may include one or more computing devices and/or other computer components (e.g., processors, memories, communication interfaces). In addition, enterprise data storage platform 130 may be configured to store and/or otherwise maintain data and information. Additionally, or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100. In another embodiment, enterprise computing platform 110 may load data from enterprise data storage platform 130, manipulate and/or otherwise process such data, and return modified data and/or other data to enterprise computing platform 110.

User device 140, user device 150, and user device 160 may be personal computing devices (e.g., desktop computer, laptop computer) or mobile computing devices (e.g., smartphone, tablet, wearable device, smart watch and the like). In addition, user devices 140, 150, and 160 may be linked to and/or used by a specific user (who may, e.g., be a customer of an enterprise institution or other organization operating enterprise computing platform 110). User devices 140, 150, and 160 may include computing hardware and software that may be configured to execute and/or otherwise provide various data or one or more enterprise applications.

Computing environment 100 also may include one or more networks, which may interconnect one or more of enterprise computing platform 110, enterprise computing infrastructure 120, enterprise data storage platform 130, user device 140, user device 150, and user device 160. For example, computing environment 100 may include a network 170 (which may, e.g., be a public or private network). Network 170 may be a high generation cellular network, such as, for example, a 5G or higher cellular network. In other embodiments, one or more networks of computing environment 100 may also be a global area network (GAN), such as the Internet, a wide area network (WAN), a local area network (LAN), or any other type of network or combination of networks.

In one or more arrangements, enterprise computing platform 110, enterprise computing infrastructure 120, enterprise data storage platform 130, user device 140, user device 150, user device 160, and/or the other systems included in computing environment 100 may be any type of computing device capable of receiving input via a user interface, and communicating the received input to one or more other computing devices. For example, enterprise computing platform 110, enterprise computing infrastructure 120, enterprise data storage platform 130, user device 140, user device 150, user device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise computing platform 110, enterprise computing infrastructure 120, enterprise data storage platform 130, user device 140, user device 150, user device 160, may, in some instances, be special-purpose computing devices configured to perform specific functions.

Figure 2A:
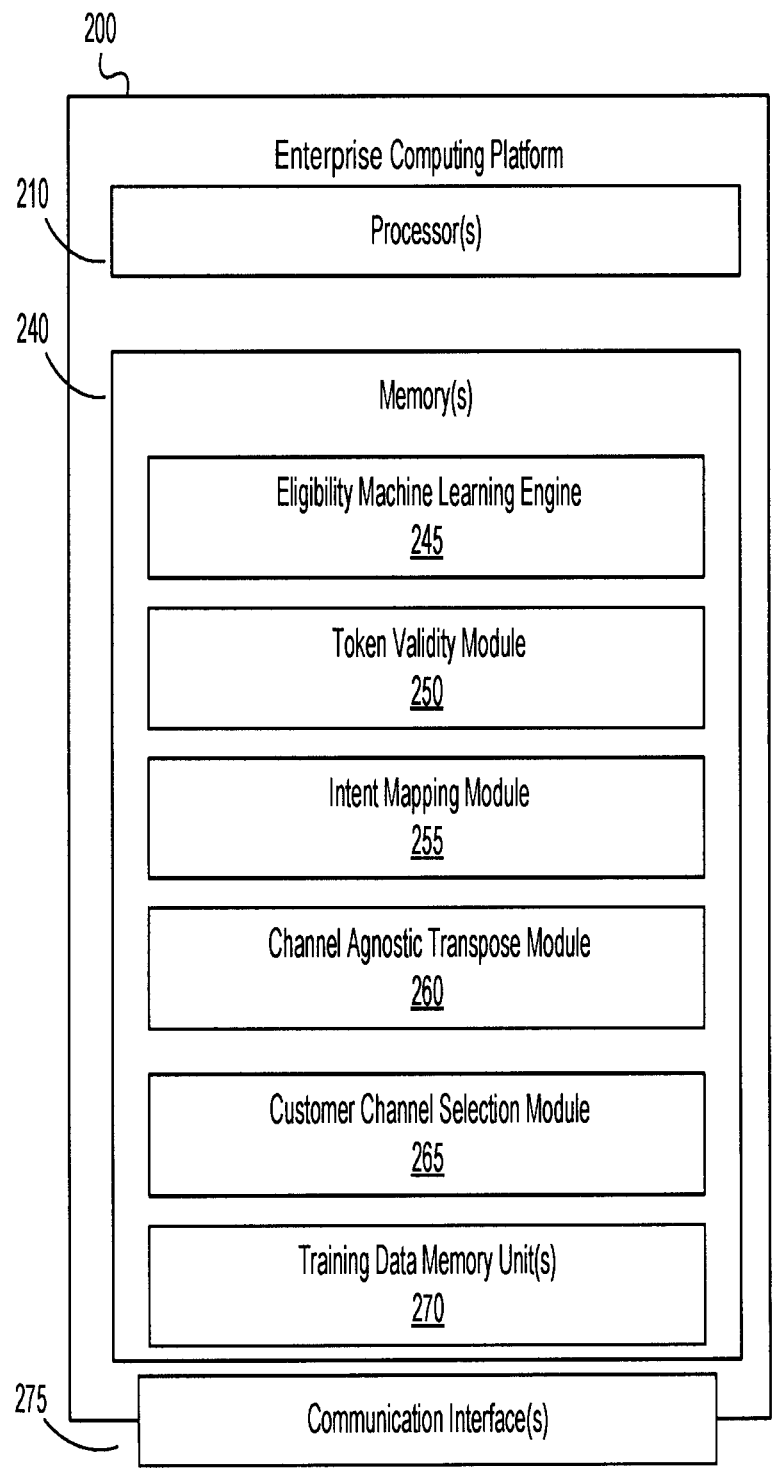
FIGS. 2A-B depict illustrative examples of an enterprise computing platform in accordance with one or more examples described herein.

FIG. 2A depicts an illustrative example of an enterprise computing platform 200 in accordance with one or more examples described herein. Enterprise computing platform 200 may include one or more processor(s) 210, memory(s) 240, and communication interface(s) 275. One or more data buses may interconnect processor(s) 210, memory(s) 240, and communication interface(s) 275. Communication interface 275 may be a network interface configured to support communication between enterprise computing platform 200 and one or more networks (e.g., a public network, a private network, a local network, or the like). Memory(s) 240 may include one or more program modules having instructions that when executed by processor(s) 210 cause enterprise computing platform 200 to perform one or more functions described herein and/or one or more databases that may store and/or otherwise maintain information which may be used by such program modules and/or processor(s) 210. In some instances, the one or more program modules and/or databases may be stored by and/or maintained in different memory units of enterprise computing platform 200 and/or by different computing devices that may form and/or otherwise make up enterprise computing platform 200. For example, memory(s) 240 may have, store, and/or include an eligibility machine learning engine 245, a token validity module 250, an intent mapping module 255, a channel agnostic transpose module 260, a customer channel selection module 265, and training data memory unit(s) 270. The processor(s) 210, memory(s) 240 and communication interface(s) 275 may be connected by one or more data buses to communicate, and send and/or receive various data, flags, information and the like.

Eligibility machine learning engine 245 may have instructions that direct and/or cause enterprise computing platform 200 to determine, via an eligibility machine learning model and based on numerical features and intent features, a preferred channel and/or additional best channel suggestion data, as discussed in greater detail below.

The token validity module 250 may have instructions that direct and/or cause enterprise computing platform 200 to generate a channel access token for a preferred channel or new channel. The token validity module 250 may have additional instructions that direct and/or cause the enterprise computing platform 200 to validate the channel access token using an incoming authentication token and/or a customer profile data.

The intent mapping module 255 may have instructions that direct and/or cause enterprise computing platform 200 to map preferred intent tags on a preferred channel or new channel from the incoming intent tags of a requested transaction.

The channel agnostic transpose module 260 may have instructions that direct and/or cause enterprise computing platform 200 to transpose, based on customer profile data and mapped preferred intent tags, preferred variable fields of a preferred or new channel from incoming variable fields of a requested transaction. The channel agnostic transpose module 260 may have additional instructions that direct and/or cause enterprise computing platform 200 to generate new intent data or transposed intent data comprising mapped preferred intent tags and transposed preferred variable fields.

The customer selection module 265 may have instructions that direct and/or cause enterprise computing platform 200 to generate a message requesting permission to perform the requested transaction on a preferred channel or new channel. The customer selection module 265 may have additional instructions that direct and/or cause enterprise computing platform 200 to identify a user device associated with a preferred channel or new channel based on a customer unique identifier (ID) and send the message to a user device through a preferred channel.

The training data memory units 270 may comprise one or more training databases used to train machine learning models in the enterprise computing platform 200.

Figure 2B:
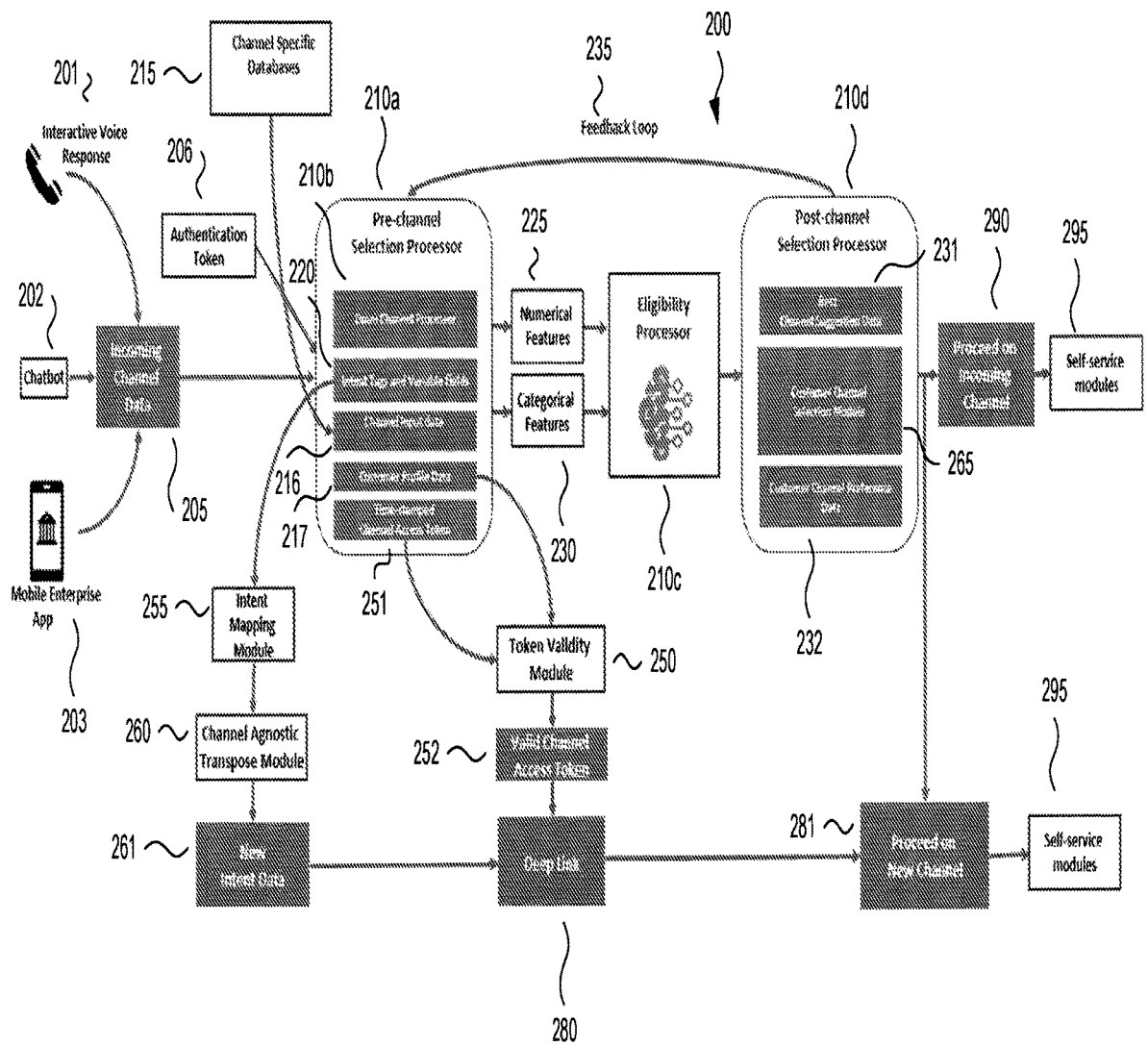

FIG. 2B depicts an illustrative example of an enterprise computing platform 200 in accordance with one or more examples described herein. Enterprise computing platform 200 may include a pre-channel selection processor or pre-channel processor 210a, an omni channel processor 210b, an eligibility processor 210c, a post-channel selection processor or post-channel processor 210d, a token validity module 250, an intent mapping module 255, a channel agnostic transpose module 260, and a customer channel selection module 265. In some embodiments, the pre-channel processor 210a includes the omni channel processor 210b. In other embodiments, the pre-channel processor 210a and the omni channel processor 210b are separate and distinct processors. In some embodiments, the post-channel processor 210d includes the customer channel selection module 265. In another embodiment, the pre-channel processor 210a includes the token validity module 250, the intent mapping module 255, and the channel agnostic transpose module 260.

Interactive voice response 201, chatbot 202, and mobile enterprise app 203 are exemplary incoming channels that may send incoming channel data 205 and/or authentication token 206 (incoming authentication token) to the enterprise computing platform 200. In addition to exemplary incoming channels interactive voice response 201, chatbot 202, and mobile enterprise app 203, an incoming channel may be an online desktop enterprise app, a communication channel for communicating with an agent of an enterprise organization, and/or another incoming channel. The incoming channel data 205 may comprise a customer unique identifier (ID), an incoming channel ID, and a requested transaction. The requested transaction may comprise incoming intent tags and incoming variable fields. The incoming intent tags may comprise label information for the requested transaction on the incoming channel. The incoming variable fields may comprise data format information for the requested transaction on the incoming channel. The authentication token 206 may include authentication or login information for a customer, with the customer unique ID, related to the requested transaction on the incoming channel.

In some embodiments, the incoming intent tags of the requested transaction are textual or audio labels that are parsed when received by the enterprise computing platform 200 using natural language processing to decipher the intended functionality of the requested transaction.

In some examples, the requested transaction may be a transaction such as making a payment, checking a balance of a customer's profile or account, changing the address associated with a customer's account or profile, and/or other transactions performed by an enterprise organization for a customer.

When the enterprise computing platform 200 receives incoming channel data 205 and authentication token 206 from an incoming channel, the communication interface 275 may receive the incoming channel data 205 and authentication token 206 and sends both to the pre-channel processor 210a. In some embodiments, the communication interface 275 additionally sends the incoming channel data 205 to the omni channel processor 210b.

The enterprise computing platform 200 also receives a plurality of channel input data 216 from channel specific databases 215. The pre-channel processor 210a may receive and store the plurality of channel input data 216. In some embodiments, the channel specific databases 215 are channel specific sources (e.g. a database, a server, and/or a data store) where each channel specific database 215 stores channel input data or historical channel input data related to channel usage information for a specific channel. Each channel input data from the plurality of channel input data 216 relates to a channel from a plurality of channels. In some embodiments, each channel input data of the plurality of channel input data comprises information on a number of times different requested transactions were completed on a channel, a number of times a channel was used by a customer, a period of time (in seconds, minutes, hours, days, months, and/or years) from when a channel was last used by a customer, periods of time (in seconds, minutes, hours, days, months, and/or years) to resolve different requested transactions on a channel historically, traffic data for a channel, a cost of a channel, a channel availability flag, functionality availability flags, complexity flags, event flags, normalized metrics, and history flags.

In some embodiments, the plurality of channel input data are unstructured data.

The pre-channel processor 210a may use the incoming channel data 205 to extract numerical features 225 and categorical features or intent features 230 from the plurality of channel input data 216. In one example, the pre-channel processor 210a extracts numerical features 225 from the plurality of channel input data 216 based on the customer unique ID and the incoming intent tags of the requested transaction. The numerical features 225 may comprise features for a number of times the requested transaction was completed on a channel, a number of times a channel was used for the customer unique ID, a period of time (in seconds, minutes, hours, days, months, and/or years) from when a channel was last used for the customer unique ID, periods of time (in seconds, minutes, hours, days, months, and/or years) to resolve the requested transaction on a channel historically, traffic data for a channel, and a cost of channel.

In another example, the pre-channel processor 210a extracts categorical features or intent features 230 from the plurality of channel input data 216 based on the incoming intent tags of the requested transaction. The categorical features or intent features 230 may comprise features for availability data of a channel for the customer unique ID, functionality data of the requested transaction on a channel, and complexity data of the requested transaction on a channel.

In some examples, the categorical features or intent features 230 for availability data of a channel for the customer unique ID and functionality data of the requested transaction on a channel are binary variables represented as a 0 or 1. If the channel availability data of a channel for the customer unique ID is a 1, the channel is available for the customer unique ID. If the channel availability data of a channel for the customer unique ID is a 0, the channel is not available for the customer unique ID. If the functionality data of the requested transaction on a channel is a 1, the channel is capable of performing the intended functionality of the requested transaction. If the functionality data of the requested transaction is a 0, the channel is not capable of performing the intended functionality of the requested transaction.

In some examples, the complexity data of the requested transaction on a channel are variables representing the complexity level (1, 2, 3, and so on) of the requested transaction on a channel.

In some embodiments, the numerical features 225 and categorical features or intent features 230 are weighted or given weights before being input into an eligibility machine learning model stored in and used by the eligibility processor 210c. For example, one of the numerical features 225 corresponding to a feature for a number of times a channel was used by a customer unique ID may be weighted more heavily or given more importance if the channel is used most frequently by the customer unique ID. In another example, one of the numerical features 225 corresponding to a feature for traffic data of a channel may be weighted less heavily or given less importance if the channel has high traffic data. In another example, one of the numerical features 225 corresponding to a feature for the number of times the requested transaction was completed on a channel may be weighted more heavily or given more importance if the channel has a high success rate of completing the requested transaction without error or failure.

The numerical features 225 and categorical features or intent features 230 are sent to the eligibility processor 210c to determine, via an eligibility machine learning model, a preferred or new channel and/or best channel suggestion data 231 for the requested transaction. The eligibility processor 210c may have instructions, that when executed by the eligibility processor 210c, direct and or cause the numerical features 225 and categorical features or intent features 230 to be input into an eligibility machine learning model, process, by the eligibility machine learning model, the numerical features 225 and categorical features or intent features 230 to determine a preferred channel or new channel and/or best channel suggestion data 231 for the requested transaction, and output, by the eligibility machine learning model, a preferred channel or new channel and/or best channel suggestion data 231 for the requested transaction. The eligibility processor 210c may then send the preferred channel or new channel and/or best channel suggestion data 231 to the post-channel processor 210d.

In some embodiments, the best channel suggestion data 231 comprises the preferred channel or new channel as well as one or more secondary preferred channels that are next best channels to the preferred channel for performing the requested transaction determined by the eligibility machine learning model.

The eligibility machine learning model may be any machine learning model including xgboosted decision trees, auto-encoders, perceptron, decision trees, support vector machines, regression, and/or a neural network. The neural network may be any type of neural network including an artificial neural network, a feed forward network, radial basis network, recurrent neural network, long/short term memory, gated recurrent unit, auto encoder, variational autoencoder, convolutional network, residual network, Kohonen network, and/or other type. In some examples, the eligibility machine learning model is a supervised machine learning algorithm.

In some embodiments, the eligibility machine learning model is trained and developed on channel specific databases 215 where each channel specific database stores historical channel input data for a channel. In some examples, each historical channel input data in each channel specific database is collected for a channel over a period of time (in seconds, minutes, hours, days, months, and/or years).

The post-channel processor 210d receives the preferred channel or new channel and/or the best channel suggestion data 231. The post-channel processor 210d may include the customer channel selection module 265. The post-channel processor 210d may store the best channel suggestion data 231 comprising the preferred channel or new channel and one or more secondary preferred channels.

In one embodiment, the customer channel selection module 265 generates a message requesting permission to perform the requested transaction on the preferred channel, identifies a user device associated with the preferred channel based on the customer unique ID, and sends the message to the user device through the preferred channel. The user device receives the message and a user of the user device may either accept or reject the message's permission to perform the requested transaction on the preferred channel.

In some examples, the user device is a smart phone, tablet, smart watch, mobile device, or a personal computing device.

If the user of the user device accepts the message's permission to perform the requested transaction on the preferred channel, the post-channel processor 210d may store the preferred channel for the requested transaction as customer channel preference data 232 for future use. The post-channel processor 210d may generate a channel switching flag indicating to the pre-channel processor 210a to initiate a channel switching process for the requested transaction on the preferred channel. The post-channel processor 210d may then send the preferred channel and channel switching flag to the pre-channel processor 210a through the feedback loop 235.

If the user of the user device rejects the message's permission to perform the requested transaction on the preferred channel, the post-channel processor 210d may store the incoming channel for the requested transaction as customer channel preference data 232 for future use. In this example, the requested transaction proceeds on the incoming channel 290 and the requested channel may be performed on one or more self-service modules 295 on the incoming channel.

In another embodiment, the customer channel selection module 265 generates a message requesting permission to perform the requested transaction on either the preferred channel, the incoming channel, or one or more secondary preferred channels, identifies a user device associated with the preferred channel based on the customer unique ID, and sends the message to the user device through the preferred channel. The user device receives the message and a user of the user device may accept the message's permission to perform the requested transaction on either the preferred channel, the incoming channel, or one or more secondary preferred channels.

The feedback loop 235 is used by the pre-channel processor 210a and the post-channel processor 210d to communicate when to initiate a channel switching process for a requested transaction on a new channel or preferred channel and/or one or more secondary preferred channels.

The pre-channel processor 210*a* may receive the preferred channel and channel switching flag from the post-channel processor 210*d* through the feedback loop 235 to initiate a channel switching process for the requested transaction on the preferred channel. As discussed in greater detail below in FIG. 4, the omni channel processor 210*b* also receives the preferred channel, determines preferred intent tags and preferred variable fields associated with the requested transaction on the preferred channel, and sends the preferred intent tags and preferred variable fields to the pre-channel processor 210*a* to be used in a channel switching process for the requested transaction on the preferred channel. The pre-channel processor 210*a* may store intent tags and variable fields 220 that may comprise the incoming intent tags, incoming variable fields, preferred intent tags, and preferred variable fields to be used in the channel switching process. The pre-channel processor 210*a* also receives and stores customer profile data 217 associated with the customer unique ID. In some examples, the customer profile data 217 is sent from either the enterprise computing infrastructure 120 or the enterprise data storage platform 130. In some examples, the customer profile data 217 may comprise account data, authentication data, and/or login information associated with the customer unique ID.

During the channel switching process, the pre-channel processor 210*a* generates a time-stamped channel access token or a channel access token 251. The customer profile data 217, the time-stamped channel access token or channel access token 251, and the authentication token or incoming authentication token 206 are sent to the token validity module 250. The token validity module 250 validates the time-stamped channel access token or channel access token 251 based on the authentication token or incoming authentication token 206 and the customer profile data 217 and outputs a valid channel access token 252. In some embodiments, the token validity module 250 further validates the time-stamped channel access token or channel access token 251 by time stamping the channel access token 251. The valid channel access token 252 is configured to authenticate a user device on the preferred channel.

The intent tags and variable fields 220 comprising the incoming intent tags, incoming variable fields, preferred intent tags, and preferred variable fields are sent to the intent mapping module 255. The intent mapping module 255 maps the preferred intent tags on the preferred channel or new channel from the incoming intent tags of the requested transaction, creating mapped preferred intent tags. The mapped preferred intent tags, incoming variable fields and preferred variable fields are sent to the channel agnostic transpose module 260. The mapped preferred intent tags may comprise label information for the requested transaction on the preferred channel that is associated with the preferred variable fields.

The channel agnostic transpose module 260 may receive the mapped preferred intent tags, incoming variable fields, preferred variable fields and the customer profile data 217. The channel agnostic transpose module 260 transposes, based on the customer profile data 217 and mapped preferred intent tags, preferred variable fields of a preferred or new channel from incoming variable fields of the requested transaction, creating transposed preferred variable fields. The transposed preferred variable fields may comprise customer profile data 217 in a data format for the requested transaction on the preferred channel that is associated with the mapped preferred intent tags. The enterprise computing platform 200 generates new intent data or transposed intent data 261 comprising the mapped preferred intent tags and the transposed preferred variable fields. The new intent data or transposed intent data 261 is used to complete the requested transaction seamlessly on the preferred channel.

The enterprise computing platform 200 generates a deep link 280 and embeds the deep link 280 with the new intent data or transposed intent data 261 and the valid channel access token 252. The deep link 280 is configured to access and complete the requested transaction on the preferred channel. The enterprise computing platform 200 identifies, based on the customer unique ID, a user device associated with the preferred channel. The enterprise computing platform 200 sends the deep link 280 to the user device through the preferred channel for the requested transaction to proceed on the new channel 281 or preferred channel. The user device receives the deep link 280 and a user of the user device interacts with the deep link 280 to access the requested transaction on the preferred channel. The requested transaction may be completed or performed on the preferred channel by one or more self-service modules 295 on the preferred channel.

In another embodiment, the enterprise computing platform 200 receives a failure flag, indicating the requested transaction failed on the preferred channel. The enterprise computing platform 200 may then receive a secondary preferred channel from the post-channel processor 210*d*. The enterprise computing platform 200 may receive secondary intent tags and secondary variable fields associated with the secondary preferred channel from the omni channel processor 210*b*. A second channel access token is generated for the secondary preferred channel and is validated based on the authentication token 206 and customer profile data 217. The secondary intent tags are mapped on the secondary preferred channel from the incoming intent tags of the requested transaction, creating mapped secondary intent tags. The secondary variable fields are transposed, based on the customer profile data 217 and mapped secondary intent tags, from the incoming variable fields, creating transposed secondary variable fields. A second new intent data or a second transposed intent data is generated comprising the mapped secondary intent tags and transposed secondary variable fields. A secondary deep link configured to access the requested transaction on the secondary preferred channel is generated and embedded with the second channel access token and second transposed intent data. The enterprise computing platform 200 identifies, based on the customer unique ID, a second user device associated with the secondary preferred channel and sends the secondary deep link through the secondary preferred channel to the second user device.

Figure 3:
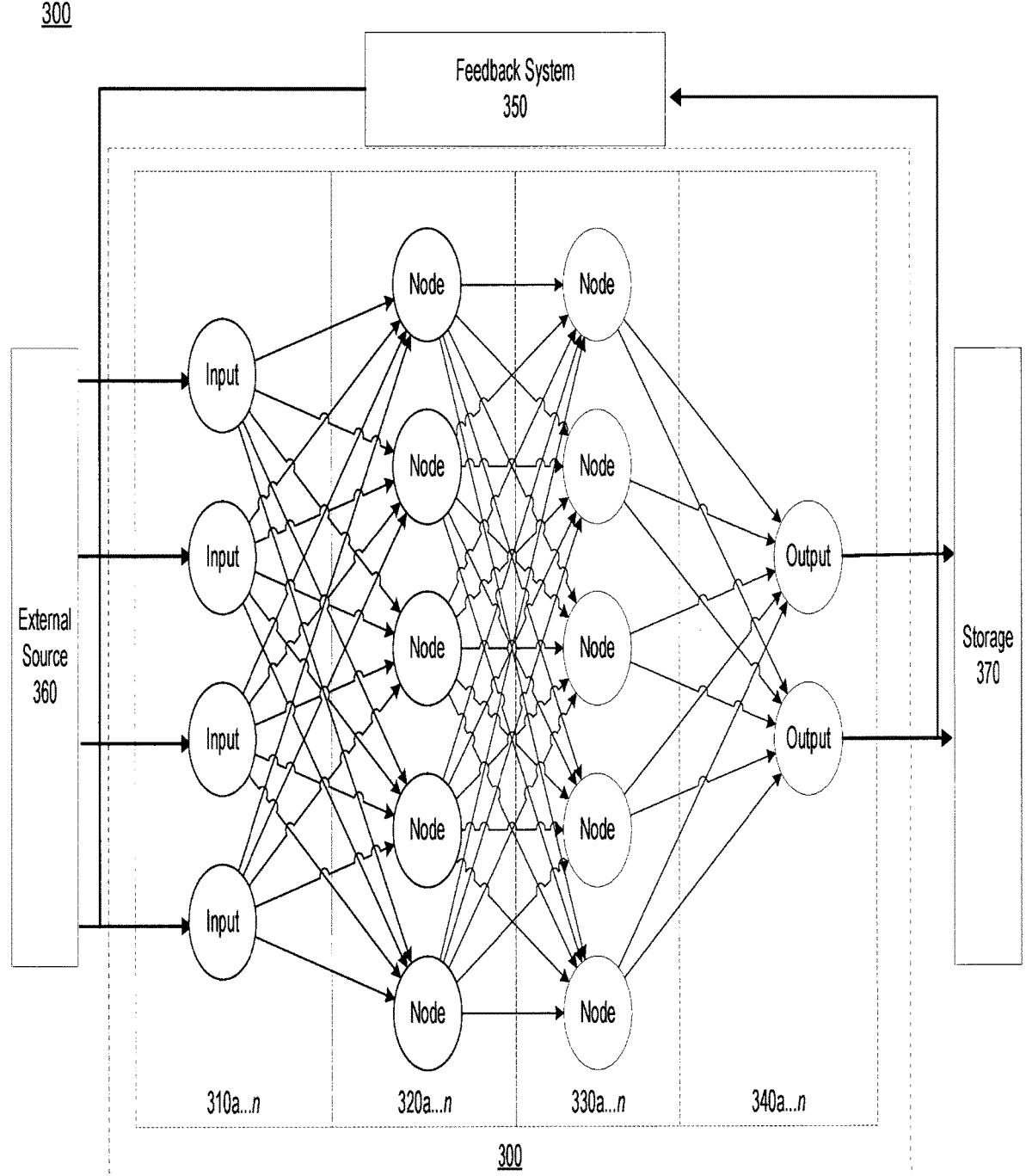
FIG. 3 depicts an illustrative artificial neural network on which one or more machine learning algorithms may be executed in accordance with one or more examples described herein.

FIG. 3 illustrates a simplified example of an artificial neural network 300 on which a machine learning algorithm may be executed. FIG. 3 is merely an example of nonlinear processing using an artificial neural network; other forms of nonlinear processing may be used to implement a machine learning algorithm in accordance with examples described herein.

By way of background, a framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons in humans, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

As elaborated herein, in practice, machine learning systems and their underlying components are tuned by data scientists to perform numerous steps to perfect machine learning systems and models. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possibly be optimized in the machine learning system. Meanwhile, one or more of data integration, selection, cleaning, and/or pre-processing steps can sometimes be the most time consuming because the old adage, "garbage in, garbage out," also reigns true in machine learning systems.

In FIG. 3, each of input nodes 310a-n is connected to a first set of processing nodes 320a-n. Each of the first set of processing nodes 320a-n is connected to each of a second set of processing nodes 330a-n. Each of the second set of processing nodes 330a-n is connected to each of output nodes 340a-n. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310a-n may originate from an external source 360. Output may be sent to a feedback system 350 and/or to storage 370. The feedback system 350 may send output to the input nodes 310a-n for successive processing iterations with the same or different input data.

In one illustrative method using feedback system 350, the system may use machine learning to determine an output. The output may include anomaly scores, heat scores/values, confidence values, and/or classification output. The system may use any machine learning model including xgboosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. For example, when training the neural network, the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 3 depicts nodes that may perform various types of processing, such as discrete computations, computer programs, and/or mathematical functions implemented by a computing device. For example, the input nodes 310a-n may comprise logical inputs of different data sources, such as one or more data servers. The processing nodes 320a-n may comprise parallel processes executing on multiple servers in a data center. And, the output nodes 340a-n may be the logical outputs that ultimately are stored in results data stores, such as the same or different data servers as for the input nodes 310a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310a-n may be processed through processing nodes, such as the first set of processing nodes 320a-n and the second set of processing nodes 330a-n. The processing may result in output in output nodes 340a-n. As depicted by the connections from the first set of processing nodes 320a-n and the second set of processing nodes 330a-n, processing may comprise multiple steps or sequences. For example, the first set of processing nodes 320a-n may be a rough data filter, whereas the second set of processing nodes 330a-n may be a more detailed data filter.

The artificial neural network 300 may be configured to effectuate decision-making. As a simplified example for the purposes of explanation, the artificial neural network 300 may be configured to detect objects in photographs. The input nodes 310a-n may be provided with a digital copy of a photograph. The first set of processing nodes 320a-n may be each configured to perform specific steps to remove non-object content, such as large contiguous sections of the color blue in the background of the photograph. The second set of processing nodes 330a-n may be each configured to look for rough approximations of objects, such as object shapes and color tones. Multiple subsequent sets may further refine this processing, each looking for further more specific tasks, with each node performing some form of processing which need not necessarily operate in the furtherance of that task. The artificial neural network 300 may then predict the location and/or label (i.e. what kind of object) of the object in the photograph. The prediction may be correct or incorrect.

The feedback system 350 may be configured to determine whether or not the artificial neural network 300 made a correct decision. Feedback may comprise an indication of a correct answer and/or an indication of an incorrect answer and/or a degree of correctness (e.g., a percentage). For example, in the object recognition example provided above, the feedback system 350 may be configured to determine if the object was correctly identified and, if so, what percentage of the object was correctly identified. The feedback system 350 may already know a correct answer, such that the feedback system may train the artificial neural network 300 by indicating whether it made a correct decision. The feedback system 350 may comprise human input, such as an administrator telling the artificial neural network 300 whether it made a correct decision. The feedback system may provide feedback (e.g., an indication of whether the previous output was correct or incorrect) to the artificial neural network 300 via input nodes 310a-n or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to identify objects, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Following on the example provided previously, the object prediction may have been incorrect because the photos provided to the algorithm were tinted in a manner which made all objects look blue. As such, the node which excluded sections of photos containing large contiguous sections of the color blue could be considered unreliable, and the connections to that node may be weighted significantly less. Additionally, or alternatively, the node may be reconfigured to process photos differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). For example, the machine learning algorithm 300 may be asked to detect faces in photographs. Based on an output, the feedback system 350 may indicate a score (e.g., 75% accuracy, an indication that the guess was accurate, or the like) or a specific response (e.g., specifically identifying where the face was located).

The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate enterprise.

Figure 4:
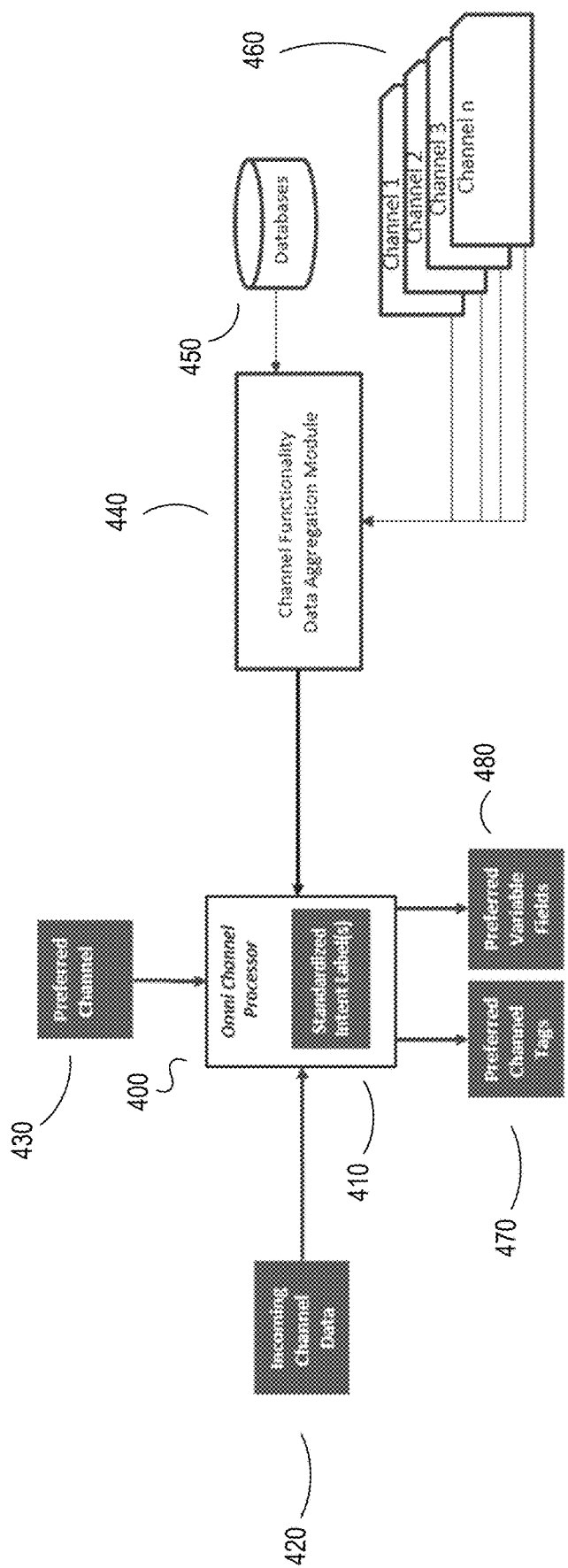
FIG. 4 depicts an illustrative example of an omni channel processor that may be used in accordance with one or more illustrative aspects described herein.

FIG. 4 illustrates an example of an omni channel processor 400 that may be used according to one or more illustrative embodiments. The omni channel processor 400 may include and or store one or more standardized intent label(s) 410.

The omni channel processor 400 may receive channel incoming channel data 420 from an incoming channel. The incoming channel data 420 may comprise a customer unique ID and a requested transaction. The requested transaction may comprise incoming intent tags. The omni channel processor 400 may also receive a plurality of channel functionality data from a channel functionality data aggregation module 440. Each channel functionality data of the plurality of functionality data relates to a channel from a plurality of channels 460. In some examples, each channel functionality data of the plurality of channel functionality data may comprise a channel ID, a channel availability flag, functionality availability flags, complexity flags, channel intent tags, and channel variable fields for a channel from the plurality of channels 460. In some examples, the channel availability flag indicates a channel is accessible for a customer, the functionality availability flags indicate functionalities of a channel related to different transactions, and the complexity flags indicate complexities of different transaction for a channel. In some examples, the channel intent tags comprise label information for different transaction on a channel and the channel variable fields comprise data format information for different transaction on a channel.

The channel functionality data aggregation module 440 may aggregate and store a plurality of channel functionality data received from databases 450 and by querying a plurality of channels 460.

The omni channel processor 400 processes the incoming intent tags to determine a functionality ID associated with the requested transaction. The functionality ID is used to standardize and map the intended functionality of the requested transaction on each channel of the plurality of channels 460. The omni channel processor 400 processes the plurality of channel functionality data based on the functionality ID and the customer unique ID to determine an intent score for each channel of the plurality of channels. The omni channel processor 400 generates and stores a standardized intent label 410 for the requested transaction associated with the customer unique ID. Then, the omni channel processor 400 maps, in the standardized intent label, the channel intent tags, channel variable fields, and channel ID with the functionality ID for each channel of the plurality of channels 460 having an intent score above a pre-determined threshold.

In some embodiments, the omni channel processor 400 processes the plurality of channel functionality data based on the functionality ID and the customer unique ID to determine an intent score for each channel of the plurality of channels 460 comprises processing the channel availability flag, functionality availability flags, and complexity flags for each channel functionality data to determine the intent score for each channel.

In some examples, the intent score for each channel functionality data indicates a channel may or may not be capable of performing the requested transaction. The pre-determined threshold may be a value of 0.5 and the intent score for each channel functionality data may be a 0 or 1.

In one embodiment, the omni channel processor 400 may receive a preferred channel 430 from a post-channel processor through a feedback loop. The omni channel processor 400 processes the standardized intent label 410 for the requested transaction associated with the customer unique ID based on the channel ID matching the preferred channel 430 to determine preferred intent tags and preferred variable fields associated with the preferred channel 430. The omni channel processor may then send the preferred intent tags and preferred variable fields to a pre-channel processor to be used in a channel switching process.

In another embodiment, the omni channel processor 400 may receive a secondary preferred channel from a post-channel processor through a feedback loop. The omni channel processor 400 processes the standardized intent label 410 for the requested transaction associated with the customer unique ID based on the channel ID matching the secondary preferred channel to determine secondary intent tags and secondary variable fields associated with the secondary preferred channel. The omni channel processor may then send the secondary intent tags and secondary variable fields to a pre-channel processor to be used in a second channel switching process.

Figure 5:
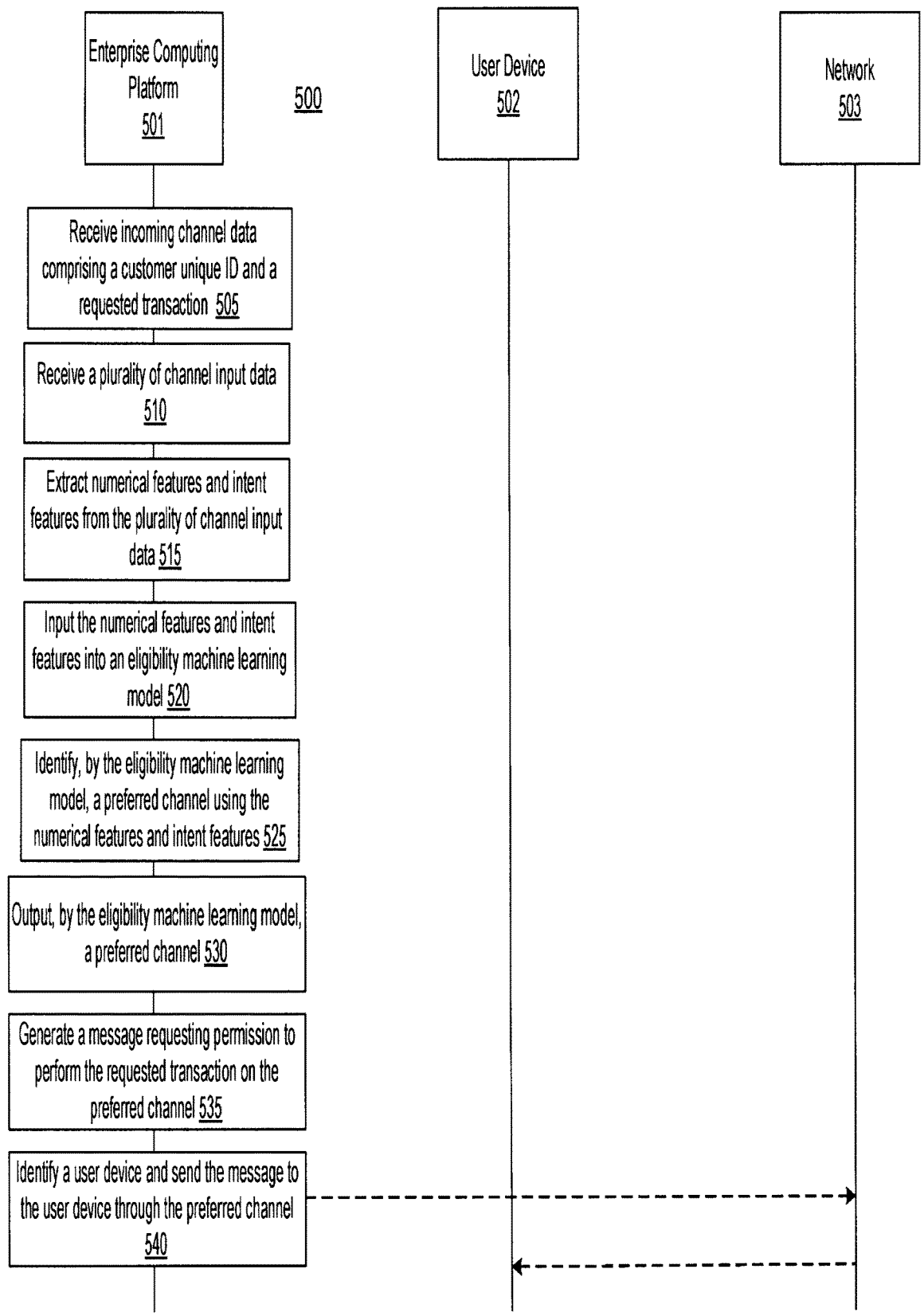
FIG. 5 depict illustrative event sequences in accordance with one or more illustrative aspects described herein.

FIG. 5 depicts an illustrative event sequence 500 in accordance with one or more illustrative aspects described herein. Referring to FIG. 5, at step 505, the enterprise computing platform 501 may receive, from an incoming channel, incoming channel data comprising a customer unique identifier (ID) and a requested transaction. The requested transaction may comprise incoming intent tags. At step 510, the enterprise computing platform 501 may receive a plurality of channel input data. Each channel input data of the plurality of channel input data may relate to a channel from a plurality of channels. At step 515, the enterprise computing platform 501 may extract numerical features and intent features from the plurality of channel input data. The enterprise computing platform 501 may extract numerical features from the plurality of channel input data based on the customer unique ID and incoming intent tags. The enterprise computing platform 501 may extract intent features from the plurality of channel input data based on the incoming intent tags.

At step 520, the enterprise computing platform 501 may input the numerical features and intent features into an eligibility machine learning model. At step 525, the eligibility machine learning model may identify, by the eligibility machine learning model, a preferred channel using the numerical features and intent features. At step 530, the eligibility machine learning model may then output the preferred channel. At step 535, the enterprise computing platform 501 may generate a message requesting permission to perform the requested transaction on the preferred channel. At step 540, the enterprise computing platform 501 may identify a user device 502 associated with the preferred channel based on the customer unique ID and send the message to the user device 502 through the preferred channel and may additionally via network 503.

Figure 6:
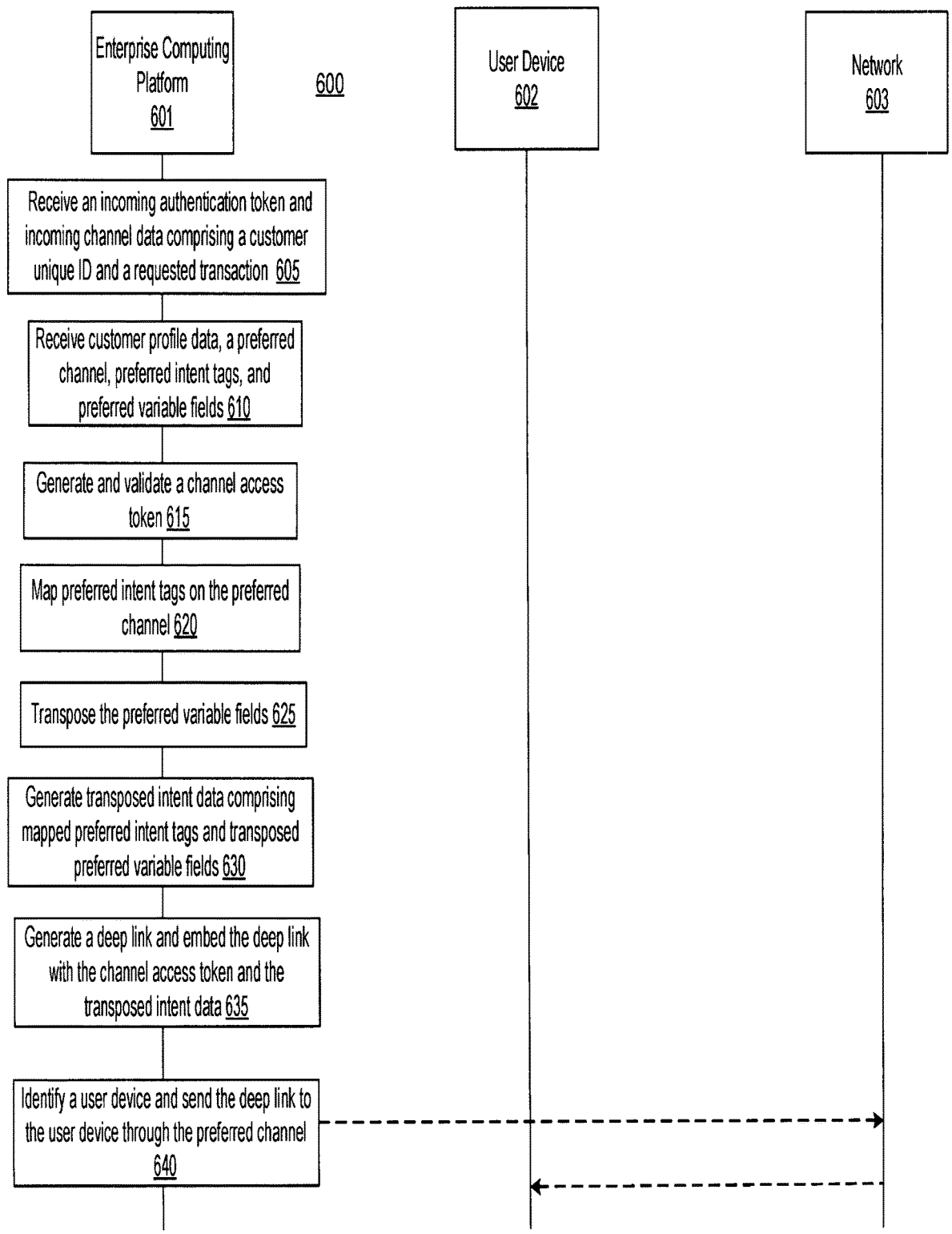
FIG. 6 depicts an illustrative event sequence in accordance with one or more illustrative aspects described herein.

FIG. 6 depicts an illustrative event sequence in accordance with one or more illustrative aspects described herein. Referring to FIG. 6, at step 605, the enterprise computing platform 601 may receive, from an incoming channel, an incoming authentication token and incoming channel data that may comprise a customer unique identifier ID and a requested transaction. The requested transaction may comprise incoming intent tags and incoming variable fields. At step 610, the enterprise computing platform 601 may receive customer profile data associated with the customer unique ID, a preferred channel, preferred intent tags, and preferred variable fields. At step 615, the enterprise computing platform 601 may generate a channel access token and validate the channel access token based on the incoming authentication token and the customer profile data.

At step 620, the enterprise computing platform 601 may map the preferred intent tags on the preferred channel from the incoming intent tags of the requested transaction. At step 625, the enterprise computing platform 601 may transpose, based on the customer profile data and mapped preferred intent tags, the preferred variable fields from the incoming variable fields. At step 630, the enterprise computing platform 601 may generate transposed intent data comprising the mapped preferred intent tags and the transposed preferred variable fields. At step 635, the enterprise computing platform 601 may generate a deep link configured to access the requested transaction on the preferred channel and embed the deep link with the channel access token and the transposed intent data. At step 640, the enterprise computing platform 601 may identify a user device 602 associated with the preferred channel based on the customer unique ID and send the deep link to the user device 602 through the preferred channel and may additionally via network 603.

Figure 7:
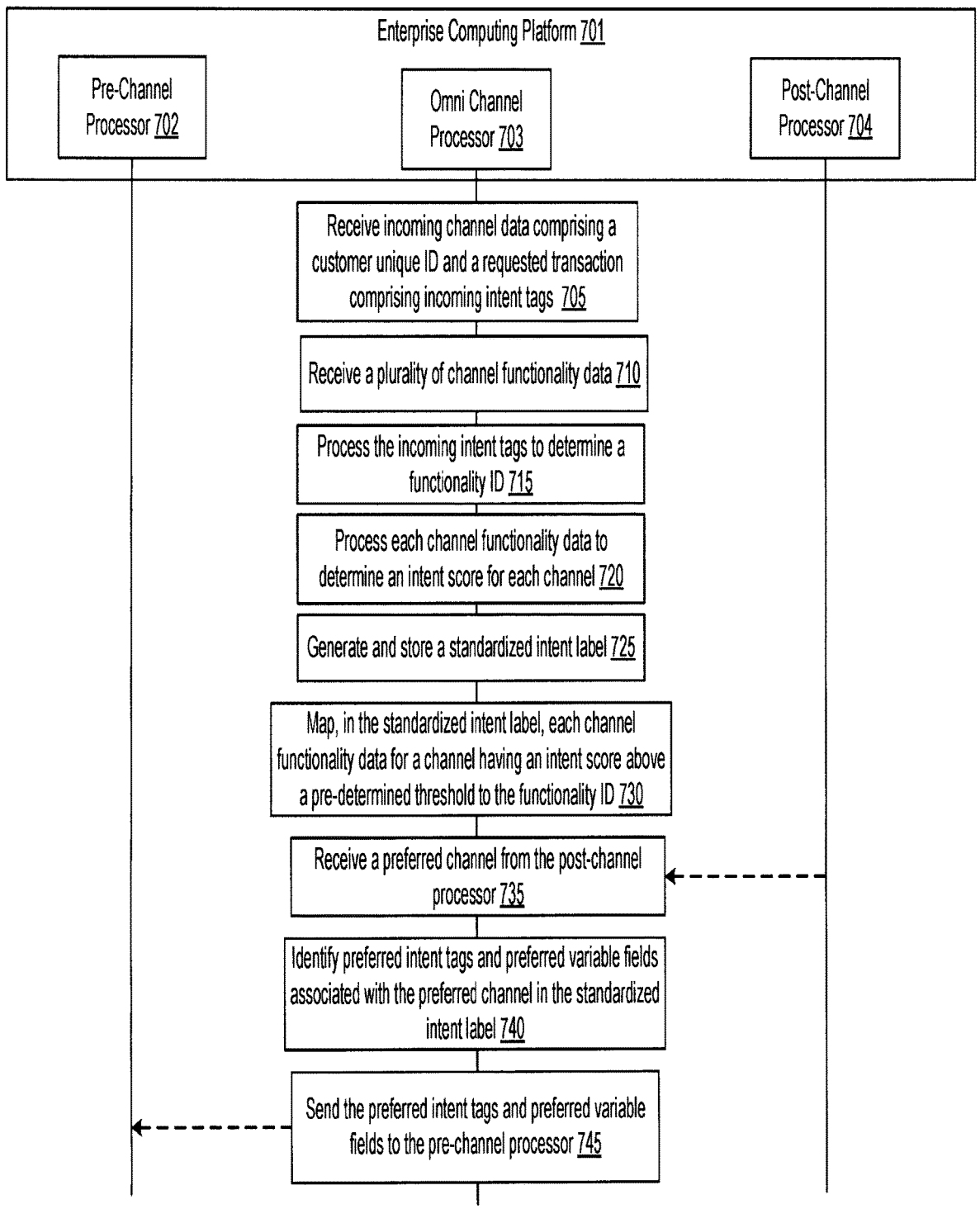
FIG. 7 shows an illustrative event sequence in accordance one or more illustrative aspects described herein.

FIG. 7 shows an illustrative flowchart in accordance with one or more illustrative aspects described herein. The enterprise computing platform 701 may comprise a pre-channel processor 702, an omni channel processor 703, and a post-channel processor 704. Referring to FIG. 7, at step 705 the omni channel processor 703 may receive, from an incoming channel, incoming channel data comprising a customer unique ID and a requested transaction. The requested transaction may comprise incoming intent tags. At step 710, the omni channel processor 703 may receive a plurality of channel functionality data. Each channel functionality data may relate to a channel from a plurality of channels. Each channel functionality data may comprise a channel ID, a channel availability flag, functionality availability flags, complexity flags, channel intent tags, and channel variable fields for a channel. At step 715, the omni channel processor 703 may process the incoming intent tags to determine a functionality ID associated with the requested transaction. At step 720, the omni channel processor 703 may process the plurality of channel functionality data based on the functionality ID and customer unique ID to determine an intent score for each channel of the plurality of channels.

At step 725, the omni channel processor 703 may generate and store a standardized intent label. At step 730, the omni channel processor 703 may map, in the standardized intent label, the channel functionality data comprising channel intent tags, channel variable fields, and a channel ID with the functionality ID for each channel of the plurality of channels having an intent score above a pre-determined threshold. At step 735, the omni channel processor may receive a preferred channel from the post-channel processor 704. At step 740, the omni channel processor 703 may identify preferred intent tags and preferred variable fields associated with the preferred channel in the standardized intent label. At step 745, the omni channel processor 703 may send the preferred intent tags and preferred variable fields to the pre-channel processor 702 that may be used in a channel switching process for the requested transaction.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
   an enterprise computing platform, comprising:
   at least one processor; and
   memory storing computer-readable instructions that, when executed by the at least one processor, cause the enterprise computing platform to:
   receive, from an incoming channel, an incoming authentication token and incoming channel data comprising a customer unique identifier (ID) and a requested transaction, wherein the requested transaction comprises incoming intent tags and incoming variable fields;
   receive customer profile data associated with the customer unique ID;
   receive a preferred channel;
   receive preferred intent tags and preferred variable fields associated with the preferred channel;
   generate a channel access token for the preferred channel;
   validate the channel access token using the incoming authentication token and the customer profile data;
   map the preferred intent tags on the preferred channel from the incoming intent tags of the requested transaction;
   transpose, based on the customer profile data and mapped preferred intent tags, the preferred variable fields from the incoming variable fields;
   generate transposed intent data comprising the mapped preferred intent tags and the transposed preferred variable fields;
   generate a deep link configured to access and complete the requested transaction on the preferred channel;
   embed the deep link with the channel access token and the transposed intent data;
   identify, based on the customer unique ID, a user device associated with the preferred channel; and
   send the deep link through the preferred channel to the user device.

2. The system of claim 1, wherein the memory of the enterprise computing platform stores additional computer-readable instructions that, when executed by the at least one processor, cause the enterprise computing platform to:
   receive a failure flag, wherein the failure flag indicates the requested transaction failed on the preferred channel;
   receive a secondary preferred channel;
   receive secondary intent tags and secondary variable fields associated with the secondary preferred channel;
   generate a second channel access token for the secondary preferred channel;
   validate the second channel access token based on the incoming authentication token and the customer profile data;
   map the secondary intent tags on the secondary preferred channel from the incoming intent tags of the requested transaction;
   transpose, based on the customer profile data and mapped secondary intent tags, the secondary variable fields from the incoming variable fields;
   generate a second transposed intent data comprising the mapped secondary intent tags and the transposed secondary variable fields;
   generate a secondary deep link configured to access the requested transaction on the secondary preferred channel;
   embed the secondary deep link with the second channel access token and the second transposed intent data;
   identify, based on the customer unique ID, a second user device associated with the secondary preferred channel; and
   send the secondary deep link through the secondary preferred channel to the second user device.

3. The system of claim 1, wherein the incoming intent tags comprise label information for the requested transaction on the incoming channel.

4. The system of claim 1, wherein the user device receives the deep link, wherein a user of the user device interacts with the deep link and accesses the requested transaction on the preferred channel, wherein the requested transaction is completed on the preferred channel.

5. The system of claim 1, wherein the received preferred channel is from a post-channel processor.

6. The system of claim 1, wherein the received preferred intent tags and preferred variable fields are from an omni channel processor.

7. The system of claim 1, wherein validate the channel access token based on the incoming authentication token and the customer profile data comprises time stamping the channel access token.

8. The system of claim 1, wherein the channel access token is configured to authenticate the user device on the preferred channel.

9. The system of claim 1 wherein the transposed intent data is used to complete the requested transaction seamlessly on the preferred channel.

10. A method, comprising:
    at an enterprise computing platform comprising at least one processor, and memory:
    receiving, from an incoming channel, an incoming authentication token and incoming channel data comprising a customer unique identifier (ID) and a requested transaction, wherein the requested transaction comprises incoming intent tags and incoming variable fields;
    receiving customer profile data associated with the customer unique ID;
    receiving a preferred channel;
    receiving preferred intent tags and preferred variable fields associated with the preferred channel;
    generating and validating a channel access token for the preferred channel using the incoming authentication token;

mapping the preferred intent tags on the preferred channel from the incoming intent tags of the requested transaction;

transposing, based on the customer profile data and the mapped preferred intent tags, the preferred variable fields from the incoming variable fields;

generating transposed intent data comprising the mapped preferred intent tags and the transposed preferred variable fields;

generating a deep link configured to access the requested transaction on the preferred channel;

embedding the deep link with the channel access token and the transposed intent data;

identifying, based on the customer unique ID, a user device associated with the preferred channel; and sending the deep link through the preferred channel to the user device.

11. The method of claim 10, further comprising:

receiving, from a user device, a failure flag, wherein the failure flag indicates the requested transaction failed on the preferred channel;

receiving a secondary preferred channel;

receiving secondary intent tags and secondary variable fields associated with the secondary preferred channel;

generating a second channel access token for the secondary preferred channel;

validating the second channel access token based on the incoming authentication token and the customer profile data;

mapping the secondary intent tags on the secondary preferred channel from the incoming intent tags of the requested transaction;

transposing, based on the customer profile data and the mapped secondary intent tags, the secondary variable fields from the incoming variable fields;

generating a second transposed intent data comprising the mapped secondary intent tags and the transposed secondary variable fields;

generating a secondary deep link configured to access the requested transaction on the secondary preferred channel;

embedding the secondary deep link with the second channel access token and the second transposed intent data;

identifying, based on the customer unique ID, a second user device associated with the secondary preferred channel; and sending the secondary deep link through the secondary preferred channel to the second user device.

12. The method of claim 10, wherein the deep link is configured to access and complete the requested transaction on the preferred channel at the user device.

13. The method of claim 10, wherein the user device receives the deep link, wherein a user of the user device interacts with the deep link and accesses the requested transaction on the preferred channel, wherein the requested transaction is completed on the preferred channel.

14. The method of claim 10, wherein the received preferred channel is from a post-channel processor.

15. The method of claim 10, wherein the received preferred intent tags and preferred variable fields are from an omni channel processor.

16. The method of claim 10, wherein validating the channel access token based on the incoming authentication token and the customer profile data comprises time stamping the channel access token.

17. The method of claim 10, wherein the channel access token is configured to authenticate the user device on the preferred channel.

18. The method of claim 10, wherein the transposed intent data is used to complete the requested transaction seamlessly on the preferred channel.

19. One or more non-transitory computer-readable media storing instructions that, when executed by an enterprise computing platform comprising at least one processor, and memory, cause the enterprise computing platform to:

receive, from an incoming channel, incoming channel data comprising a customer unique identifier (ID) and a requested transaction, wherein the requested transaction comprises incoming intent tags and incoming variable fields;

receive customer profile data associated with the customer unique ID;

receive a preferred channel;

receive preferred intent tags and preferred variable fields associated with the preferred channel;

generate a channel access token for the preferred channel;

validate and time stamp the channel access token;

map the preferred intent tags on the preferred channel from the incoming intent tags of the requested transaction;

transpose, based on the customer profile data and mapped preferred intent tags, the preferred variable fields from the incoming variable fields;

generate transposed intent data comprising the mapped preferred intent tags and the transposed preferred variable fields;

generate a deep link configured to access the requested transaction on the preferred channel;

embed the deep link with the channel access token and the transposed intent data;

identify, based on the customer unique ID, a user device associated with the preferred channel; and send the deep link through the preferred channel to the user device.

20. The one or more non-transitory computer-readable media of claim 19, storing further instructions that, when executed by an enterprise computing platform comprising at least one processor, and memory, cause the enterprise computing platform to:

receive, from a user device, a failure flag, wherein the failure flag indicates the requested transaction failed on the preferred channel;

receive a secondary preferred channel;

receive secondary intent tags and secondary variable fields associated with the secondary preferred channel;

generate a second channel access token for the secondary preferred channel;

validate the second channel access token based on the customer profile data;

map the secondary intent tags on the secondary preferred channel to the incoming intent tags of the requested transaction;

transpose, based on the customer profile data and mapped secondary intent tags, the secondary variable fields from the incoming variable fields;

generate a second transposed intent data comprising the mapped secondary intent tags and the transposed secondary variable fields;

generate a secondary deep link configured to access the requested transaction on the secondary preferred channel;

embed the secondary deep link with the second channel access token and the second transposed intent data;

identify, based on the customer unique ID, a second user device associated with the secondary preferred channel; and send the secondary deep link through the secondary preferred channel to the second user device.

\* \* \* \* \*